(12) United States Patent
McCollum et al.

(10) Patent No.: US 8,166,516 B2
(45) Date of Patent: Apr. 24, 2012

(54) DETERMINING EFFECTIVE POLICY

(75) Inventors: Raymond W McCollum, Redmond, WA (US); Khushru M Irani, Redmond, WA (US); Sylvain P Galineau, Seattle, WA (US); Francois L Cantonnet, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1063 days.

(21) Appl. No.: 12/057,352

(22) Filed: Mar. 27, 2008

(65) Prior Publication Data

US 2009/0249431 A1    Oct. 1, 2009

(51) Int. Cl.
*H04L 29/06* (2006.01)
(52) U.S. Cl. .......................................... 726/1
(58) Field of Classification Search .................. None
See application file for complete search history.

(56) References Cited

U.S. PATENT DOCUMENTS

| | | | |
|---|---|---|---|
| 5,412,758 A * | 5/1995 | Srikanth et al. ................ 706/59 |
| 6,243,747 B1 | 6/2001 | Lewis et al. | |
| 6,327,618 B1 | 12/2001 | Ahlstrom et al. | |
| 6,381,639 B1 | 4/2002 | Thebaut et al. | |
| 6,466,932 B1 | 10/2002 | Dennis et al. | |
| 6,587,876 B1 | 7/2003 | Mahon et al. | |
| 6,826,698 B1 | 11/2004 | Minkin et al. | |
| 7,007,032 B1 * | 2/2006 | Chen et al. ................... 707/693 |
| 7,171,459 B2 | 1/2007 | Sanghvi et al. | |
| 2002/0103994 A1 * | 8/2002 | Morrison et al. ................ 713/1 |
| 2003/0154404 A1 * | 8/2003 | Beadles et al. ................ 713/201 |
| 2004/0215650 A1 | 10/2004 | Shaji et al. | |
| 2004/0250059 A1 * | 12/2004 | Ramelson et al. ............. 713/150 |
| 2005/0172015 A1 | 8/2005 | Rana et al. | |
| 2005/0262076 A1 | 11/2005 | Voskuil | |
| 2006/0167858 A1 | 7/2006 | Dennis et al. | |
| 2008/0201761 A1 * | 8/2008 | Irani et al. ........................ 726/1 |
| 2009/0178106 A1 * | 7/2009 | Feng et al. ........................ 726/1 |

OTHER PUBLICATIONS

Heidelberg, "WindowsSecurity.com", Published Nov. 29, 2006, TechGenix Ltd., pp. 1-7.
"Group Policy Object Infrastructure Management at Microsoft: Design, Troubleshooting, and Lifecycle Management", Nov. 29, 2006, CNET Networks, Inc., pp. 4.
Sloman, "Conflict Analysis for Management Policies", Proceedings of the Vth International Symposium on Integrated Network Management IM'97 (formerly Known as ISINM), May 1997, pp. 1-14.

* cited by examiner

*Primary Examiner* — David Pearson

(57) ABSTRACT

Aspects of the subject matter described herein relate to determining effective policy when more than one policy may be associated with an entity. In aspects, bindings associate policies with target groups that may include one or more entities. The bindings are ordered by precedence. When properties of two or more policies affect an entity, properties of policies in higher precedence bindings control (e.g., override) properties of policies in lower precedence bindings. When a property of a policy is not included in other policies that affect an entity, the property is retained. A policy resolver determines disjoint target groups and a resultant policy associated with each disjoint target group. The resultant policy associated with a disjoint target group represents a combination of the original policies according to precedence.

19 Claims, 12 Drawing Sheets

DETERMINING EFFECTIVE POLICY

BACKGROUND

In some computing environments, there are many types of machines, products, and services. These entities may be managed by multiple administrators who have overlapping and non-overlapping spans of control. For example, in some cases, an administrator may be responsible for all installed software and services for a certain set of machines in a particular location, and in other cases, an administrator may be responsible for a specific product and services regardless of where the machines might be located. For example, a first administrator may be responsible for all machines in a particular building, whereas a second administrator may be responsible for the configuration and maintenance of all database servers, regardless of location. This may lead to conflicting intent when it comes to policy and desired state.

When there are large numbers of machines and many administrators trying to establish their intent, or "policy," the resultant configuration of any given machine is very often not known. This gives rise to a very undesirable state of affairs, since a given machine may inadvertently have acquired an untenable, unsafe, or unsecure configuration.

SUMMARY

Briefly, aspects of the subject matter described herein relate to determining effective policy when more than one policy may be associated with an entity. In aspects, bindings associate policies with target groups that may include one or more entities. The bindings are ordered by precedence. When properties of two or more policies affect an entity, properties of policies in higher precedence bindings control (e.g., override) properties of policies in lower precedence bindings. When a property of a policy is not included in other policies that affect an entity, the property is retained. A policy resolver determines disjoint target groups and a resultant policy associated with each disjoint target group. The resultant policy associated with a disjoint target group represents a combination of the original policies according to precedence.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
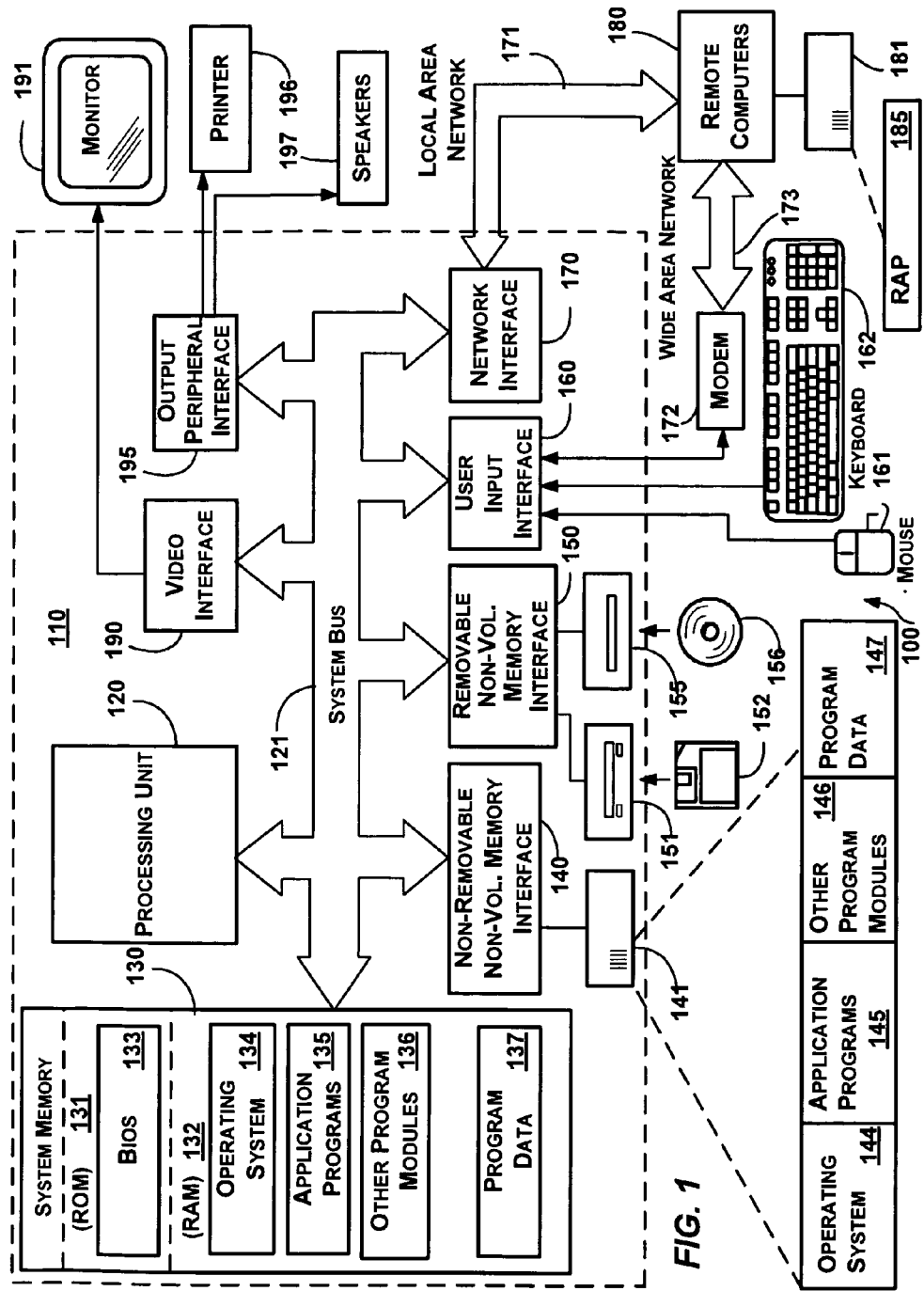
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Policy

As mentioned previously, setting multiple policies on multiple entities is challenging. While this may be challenging even when one administrator is involved, it is even more challenging when many administrators are involved.

As used herein, a policy is a logical document containing one or more properties, which abstract the notion of a desired configuration for a software or hardware entity. The document may be formatted in any manner and may be included in other documents. In one embodiment, a document is a data structure and may be included in a file, database, memory, or other computer storage medium as that term is defined in conjunction with FIG. 1.

A property may be viewed as a "setting", and may be formally denoted as a tuple as follows:

Property={Name,Type,Value}

A property has a name, type, and value. A policy includes zero or more properties and may be denoted formally as:

Policy={Property*}

The "*" above indicates that a policy may include zero or more of the preceding property.

A policy may be applied to a target. A target is a machine, service, user, device, other entity, or the like to which a policy may be applied. Targets may be grouped together and a policy applied to the group of targets.

A target group may be formally defined as:

TargetGroup={Target*}

As shown in the syntax above, a target group may include zero or more targets.

Some examples of target groups include, for example, a group of machines in a particular building, a particular administrative domain, or a specific group of users, such as "Backup Operators." Although some examples have been given for target groups, the above examples are not intended to be all-inclusive or exhaustive of the different types of target groups. Indeed, those skilled in the art will recognize many other examples of target groups that may also be used without departing from the spirit or scope of aspects of the subject matter described herein.

A binding is an entity which "associates" a previously established policy with a previously established target group. Based on the teachings herein, it will be recognized by those skilled in the art, that the above mechanism allows policy definitions to be updated independently of their targets, or target definitions to be updated independently of the policy definition, since the binding object is the actual instruction to "apply" the policy.

In aspects of the subject matter described herein, the binding object is also amenable to conditional policy bindings. For example, a binding may contain an instruction that the policy is in effect only within a certain time window (such as between midnight and 6:00 am) or under certain administrative conditions (the policy is only in effect when the machine is not down for maintenance).

Conditional policy bindings allows a binding with a lower precedence to act as a default, with the higher precedence policy only coming into effect during the conditional window, then expiring once the condition has terminated.

A binding may formally be defined as a tuple that includes two references as follows:

Binding={Policy reference,TargetGroup reference}

In the above definition, a binding references a policy and a target group.

Figure 2:
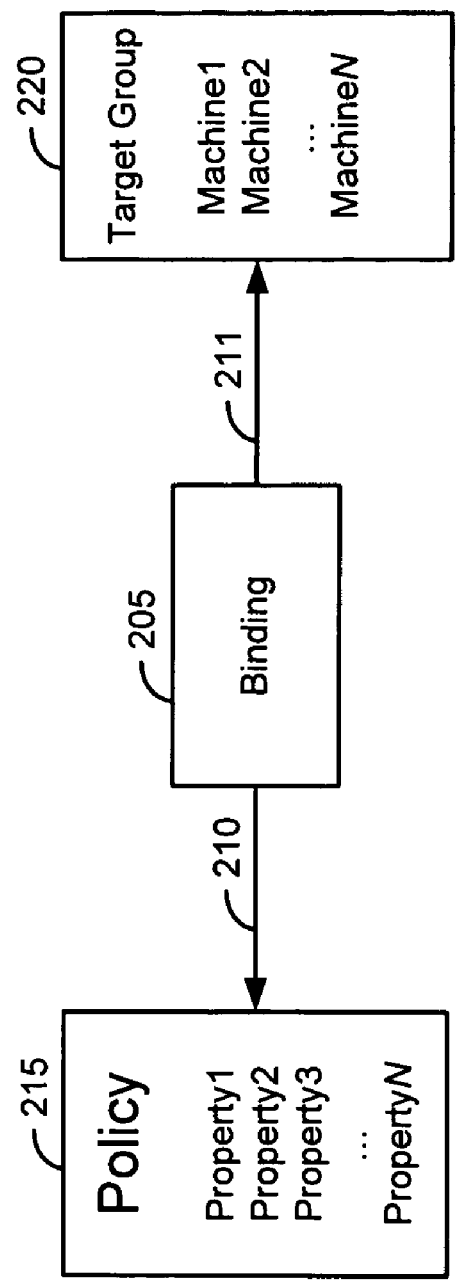
FIG. 2 is a block diagram that graphically represents an exemplary binding in accordance with aspects of the subject matter described herein.

FIG. 2 is a block diagram that graphically represents an exemplary binding in accordance with aspects of the subject matter described herein. In particular the binding 205 includes a reference 210 to a policy 215 and a reference 211 to a target group 220. In one embodiment, a binding is constrained to reference an existing policy and an existing target group. A binding allows a policy to be independently authored and maintained without knowing which targets it will be applied to, and for targets to be maintained based on their actual membership needs and not based on what policies they might acquire.

Figure 3:
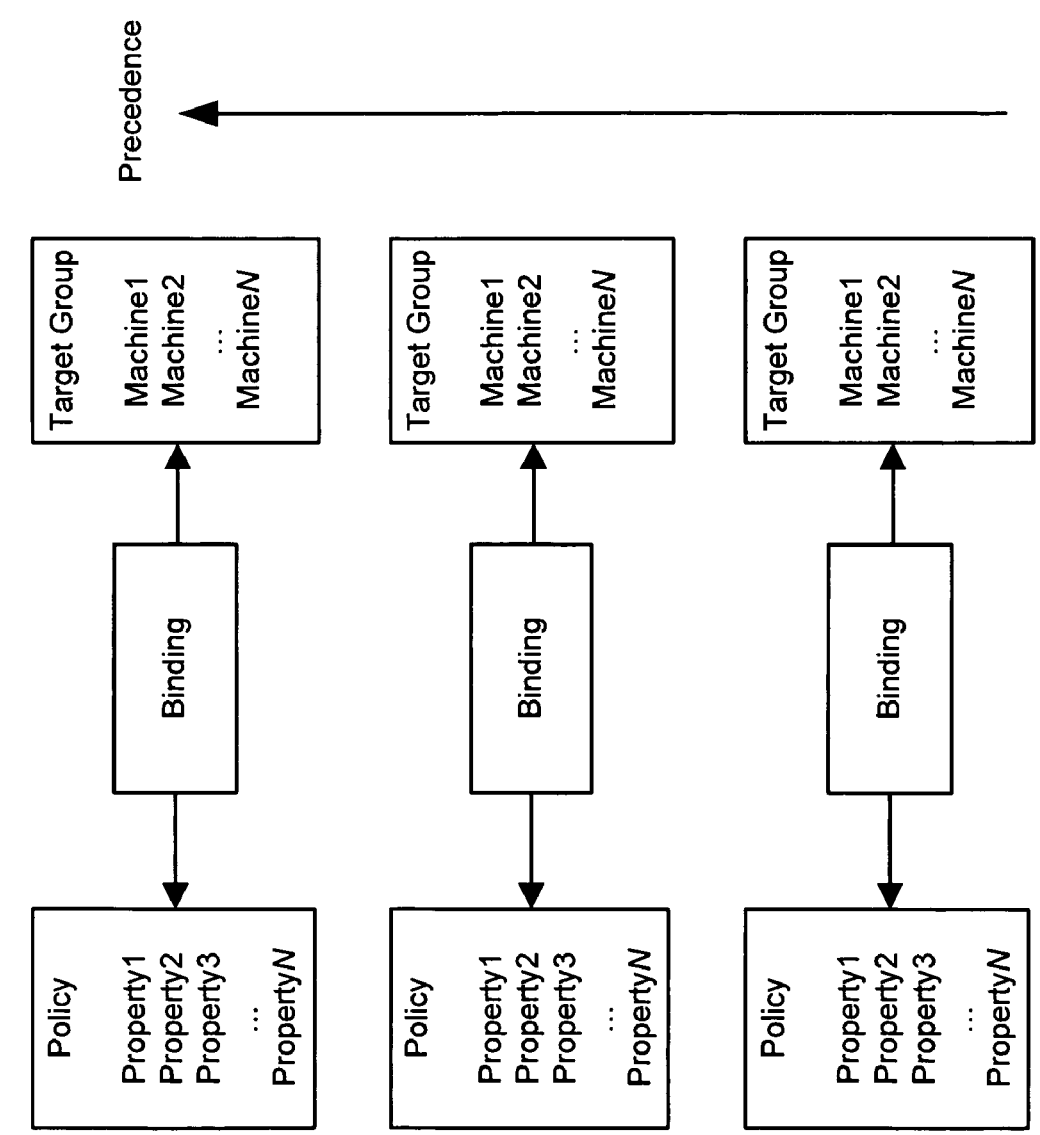
FIG. 3 is a block diagram that graphically represents an exemplary policy stack in accordance with aspects of the subject matter described herein.

FIG. 3 is a block diagram that graphically represents an exemplary policy stack in accordance with aspects of the subject matter described herein. A policy stack is a group of bindings arranged or arrangeable in order of precedence. Policies near the top of the stack are said to have higher precedence, or more importance, while policies located near the bottom of the stack have lower precedence or lower importance.

A policy stack may be formally defined as a set of one or more tuples as follows:

PolicyStack=(Policy,Binding,TargetGroup)+

Note that a policy stack does not need to be placed in a stack data structure. It may also be represented in other data structures such as a linked list, an array, a collection where each item has a precedence, other data structures, and the like.

In one embodiment, widespread "default" policies may be placed near or at the bottom of the policy stack while more specific or overriding policy are placed at a higher precedence in the policy stack. However, in another embodiment, this order may be reversed or another order may be used.

In one embodiment, a component, process, or the like (hereinafter sometimes referred to as a "policy resolver") that determines and/or applies policies to targets may receive as input a data structure that includes a policy stack and emit a disjunctive set of bindings which has resolved conflicting intent and overlapping targets. The output may look precisely like the input stack if no conflicts have occurred, or it may diverge completely and even have a different number of elements. The output set has no precedence, since the target groups have fully disjoint members, so the associated policy is the only policy for its associated target group.

In one embodiment, the policy resolver begins evaluation at the bottom of the stack. The policy is applied to all entities within the target group. This lowest policy comprises the "default" policy for those entities.

Next, the policy resolver moves upward to the next binding. This policy is now applied to all machines in its target group. Because a machine may appear in the new target group as well as the previous one, some machines in the new target group may acquire the new policy, while others not in the group will retain the old one.

This method described above is repeated, moving toward the top of the stack, until the stack is exhausted. If a target group is reused, the topmost policy (i.e., highest precedence policy) overrides all the lower precedence policies associated with the target group. Conversely, if none of the groups overlap, then each policy as shown in the stack is retained and applied to its target group.

In some embodiments, a policy may not have all of its properties defined. In these embodiments, a higher level policy overrides only the properties that it shares in common with a lower precedence policy for entities for which the two policies target in common. When a policy does not include properties included in lower level policies for an entity, a new effective policy may be created for that binding which is a "merged" policy containing values from both policy documents.

As the policy resolver proceeds to the top of the stack, each policy document may contain only a few overrides of properties appearing in previous policies, or the policy may contain new properties which do not appear lower in the policy stack.

Based on the teachings herein, it will be recognized by those skilled in the art, that the mechanism described above may accommodate the intent of multiple administrators (each of which may own their own bindings), overlapping groups, and yet predict the final outcome. In one embodiment, it also allows for both a default or baseline policy and allows for absolute overrides (e.g., for legal reasons) to be placed at the top of the stack.

In one embodiment, the method used by the mechanism above may be described as follows:

Phase 1

1. Begin at the bottom of the stack.

2. Examine the binding B.

3. Locate the target group G referred to in the binding and evaluate it to produce a set S of all targets in that group.

4. Locate the policy P named in the binding, and apply all individual properties to each element of S.

5. If a property does not exist in S, create it. If it already exists, overwrite it with the new property.

6. Move up to the stack to the next binding. If there are no more bindings, go to 7. If there is another binding that has not been evaluated go to step 2 above.

7. At this point, each target has the composite of all the settings which apply to it. Proceed with Phase 2.

Phase 2

1. Determine entities that have a set of properties with identical names and values. Place these entities into a commonly named target group with a random name, and create a policy with a random name and a binding to attach the target group with the policy.

2. Continue 1 until all entities have been processed.

3. For each set of entities that has identical membership to one of the original target groups in the original stack, rename this group to have the original name.

4. For each policy which has identical properties to a policy in the original stack, rename the policy to have the name of the policy in the original stack.

Upon completion of Phase 2, there will be a set of policies, bindings, and target groups which are fully disjoint and which have no precedence. In some cases the set will be identical or nearly identical to the input policy stack, and in some cases the set may be radically different.

This output may now be directly used to apply or deliver policy, since each target in the target groups has only one associated effective policy.

Based on the teachings herein, those skilled in the art may recognize optimizations to the algorithm described above that are equivalent in terms of final result but may vary in order, number, or types of steps. Such optimizations are within the spirit and scope of aspects of the subject matter described herein.

Below is described an example of applying the algorithm above. The example uses XML for the document format for Policies, target groups, and bindings as defined previously. The below description using XML is not to be read to limit aspects of the subject matter described herein just to documents formatted according to XML. Indeed, any data structure capable of representing policies may be used without departing from the spirit or scope of aspects of the subject matter described herein.

A policy (e.g., "PolicyA") may describe firewall settings as follows:

```
<Policy Id="PolicyA">
    <FirewallSetting Name="TcpPortOpen"> 80 </FirewallSetting>
    <FirewallSetting Name="TcpPortClosed"> 443 </FirewallSetting>
</Policy>
```

Each policy receives an identifier, which is defined within the XML. In the above example, the policy is identified as "PolicyA."

A Target group may also be defined in an XML document which lists entities to which are to be applied one or more policies bound to the Target group. Below is an example of a XML document that describes a Target group:

```
<TargetGroup Id="Building43Group">
    <Computer>corpnet.X123.acme.com</Computer>
    <Computer>corpnet.YServer.acme.com</Computer>
</TargetGroup>
```

Similarly a binding may be defined in an XML documents. A binding may reference a policy (e.g., PolicyA) and a target group (e.g., Building43Group). Below is an example of an XML document that describes a binding:

```
<Binding>
    <Policy>PolicyA</Policy>
    <TargetGroup>Building43Group</TargetGroup>
    ...
</Binding>
```

Note that in one embodiment, a binding may bind a policy to multiple target groups, may bind multiple Policies to a single target group, or may bind multiple policies to multiple target groups.

Many more policies, target groups, and bindings may be created and submitted to the policy resolver. The policy resolver applies the algorithm and may emit a new "resolved" policy stack in the same format.

In one embodiment, permissions may be established that limit:

1. Who can add new elements to the stack or delete them, and at what location in the stack;

2. Who can edit property values (without changing the bindings);

3. Who can change the membership of a target group; and/or

4. Other creation/deletion/modification actions related to any of the above.

In one embodiment, time subranges may be assigned to bindings to define when a policy comes into effect and when it expires.

In one embodiment, the precedence of a policy may be defined by assigning the precedence as a value in the binding. For example, in XML, precedence may be defined in a binding as follows:

```
<Binding>
    <Policy>PolicyA</Policy>
```

```
        <TargetGroup>Building43Group</TargetGroup>
        <Precedence>10</Precedence>
    </Binding>
```

The documents may be sent to a validator that validates that all policies and target groups exist and that each binding has a different precedence value.

Figure 4:
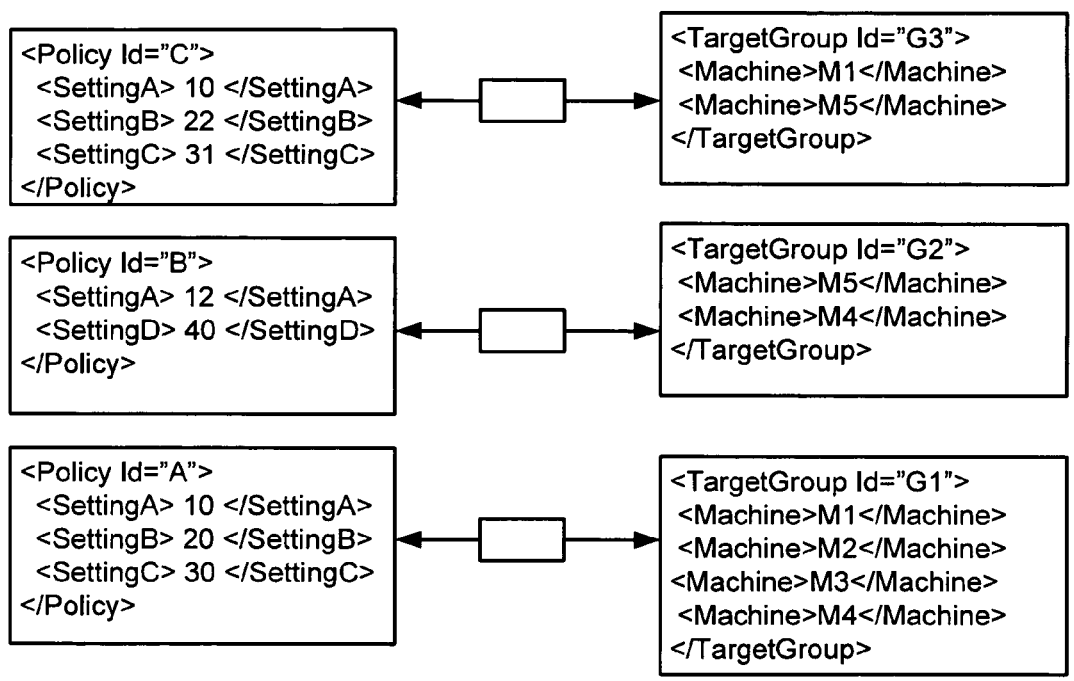
FIGS. 4 and 5 are block diagrams that illustrate a stack that is processed and output that is generated therefrom in accordance with aspects of the subject matter described herein.
Figure 5:
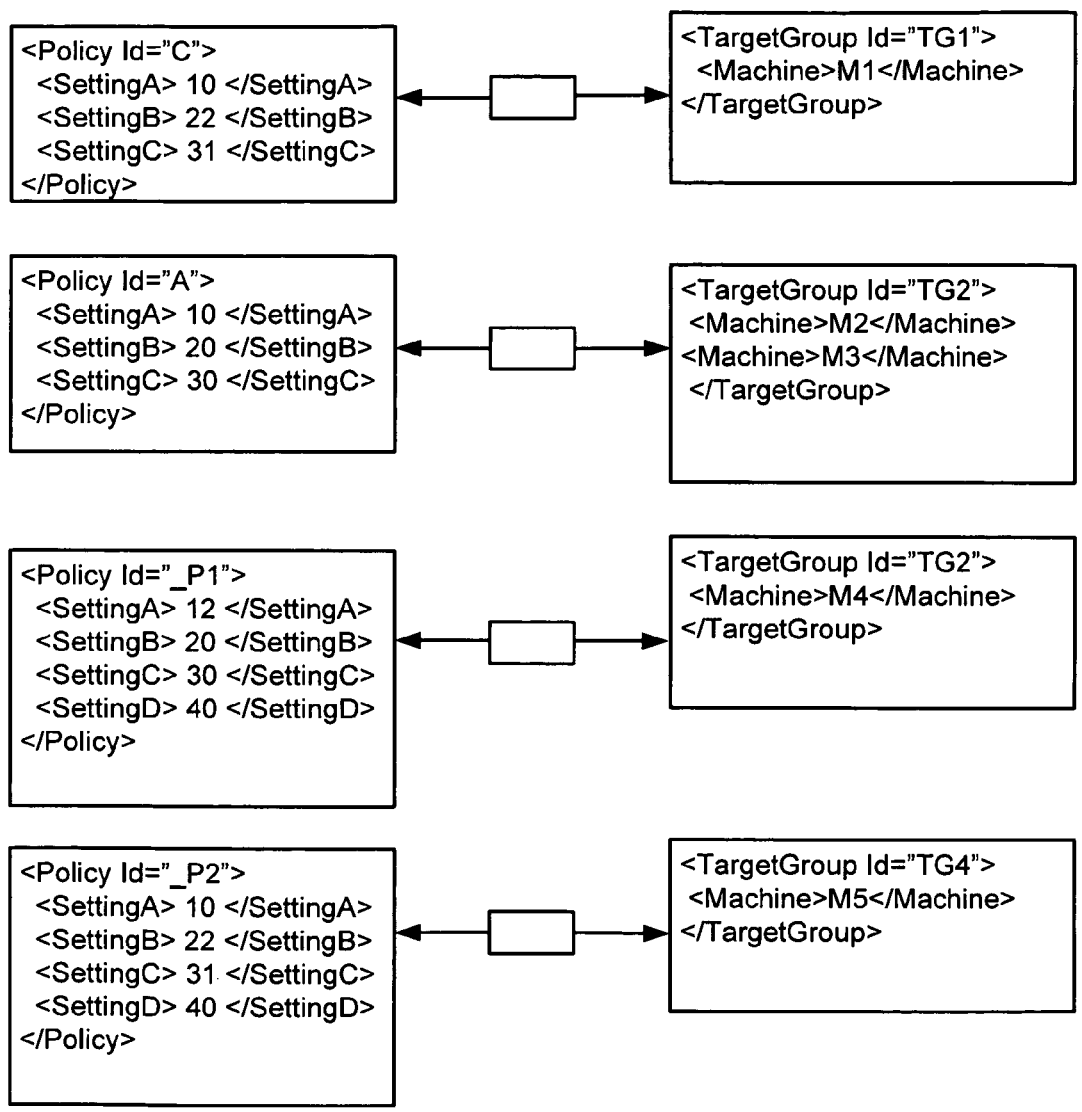

FIGS. 4 and 5 are block diagrams that illustrate a stack that is processed and output that is generated therefrom in accordance with aspects of the subject matter described herein. During the first part of the algorithm described previously, processing starts at the bottom of the stack and values are assigned to each machine as indicated in the following table:

| Machine | Setting A | Setting B | Setting C | Setting D |
|---|---|---|---|---|
| M1 | 10 | 20 | 30 | Null |
| M2 | 10 | 20 | 30 | Null |
| M3 | 10 | 20 | 30 | Null |
| M4 | 10 | 20 | 30 | Null |

When the next binding is evaluated, a new machine is introduced and values are overridden in the previous table. Following is a table that shows the values after the values are overridden. The changes are in bold:

| Machine | Setting A | Setting B | Setting C | Setting D |
|---|---|---|---|---|
| M1 | 10 | 20 | 30 | Null |
| M2 | 10 | 20 | 30 | Null |
| M3 | 10 | 20 | 30 | Null |
| M4 | 12 | 20 | 30 | 40 |
| M5 | 12 | Null | Null | 40 |

Finally the top binding is evaluated and the final results are illustrated in the following table with changes shown in bold:

| Machine | Setting A | Setting B | Setting C | Setting D |
|---|---|---|---|---|
| M1 | 10 | 22 | 31 | Null |
| M2 | 10 | 20 | 30 | Null |
| M3 | 10 | 20 | 30 | Null |
| M4 | 12 | 20 | 30 | 40 |
| M5 | 10 | 22 | 31 | 40 |

Upon completion of the algorithm, the resulting set of different policies has increased to 4, since machines M2 and M3 have identical settings and all the others are different. The memberships of the target groups are disjoint. The resulting set of bindings is shown in FIG. 5. The precedence, if any, shown in FIG. 5 has no meaning as the target groups are now disjoint members.

Note that Policies "A" and "C" have remained intact for some targets, so their names were retained. The other groups and policies did not appear in the original stack and so have random names. The policies for each target group are now normalized and may be delivered and/or applied to the members of the target group.

Optimization

In another embodiment, an optimization of the algorithm described above may be performed. The algorithm may be described as follows:

1. Given a set of target groups, T, determine the set of disjoint groups, D, that result from these target groups. The target groups themselves can have overlapping members, but the disjoint groups do not have any overlapping members.
2. For each disjoint group:
    A. Walk the list of its target groups (obtained from step 1) and determine the policy (or policies) applied to each target group;
    B. For each policy obtained in step (2A), determine the precedence of its binding, B, with that target group;
    C. Order the list of policies in precedence such that the bottom of the list has the policy with lowest binding precedence;
    D. Starting with the policy on the top of this ordered list;
        a. Add all the properties in this policy into the resultant policy, R;
        b. For the next policy in this list, determine if there are any properties that are not in the resultant policy; if there are, add them to R.
        c. Continue with step 2(D)(b) until all policies in the list have been processed.
3. If there are more disjoint groups, move to the next disjoint group and repeat step 2 above.

Figure 6:
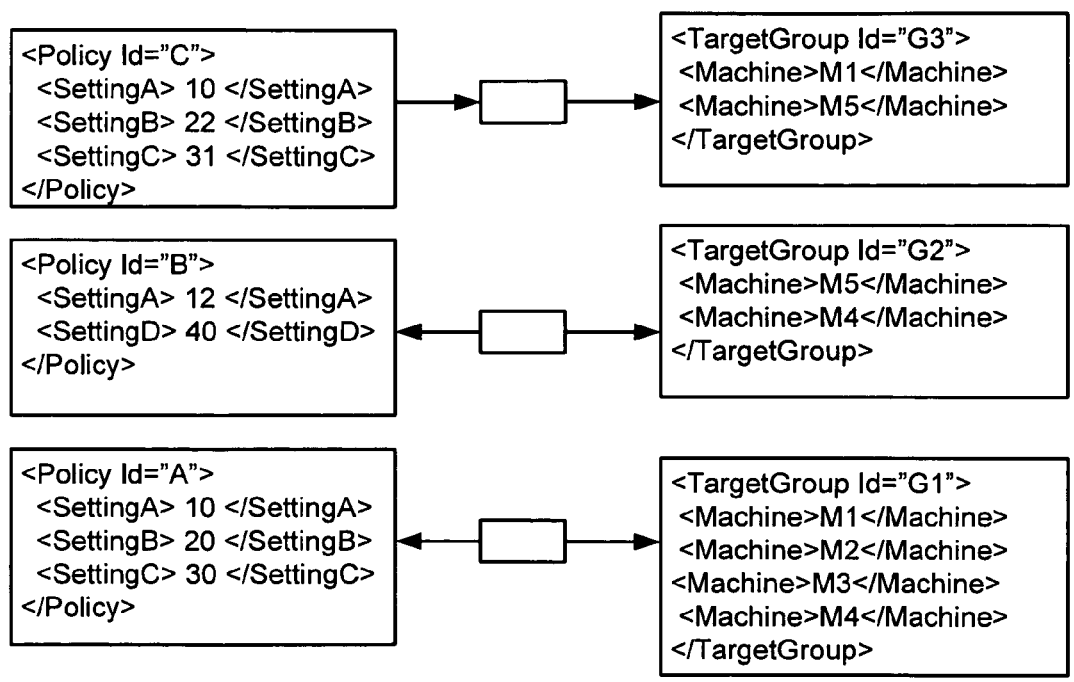
FIGS. 6-9 are block diagrams that illustrate a stack that is processed and output that is generated therefrom according to the algorithm above in accordance with aspects of the subject matter described herein.

FIGS. 6-9 are block diagrams that illustrate a stack that is processed and output that is generated therefrom according to the algorithm above in accordance with aspects of the subject matter described herein. FIG. 6 illustrates the original policies and target groups to which they are bound before the algorithm commences. The policies are ordered such that the policies higher on the page in FIG. 6 are higher in precedence than the policies lower on the page.

Figure 7:
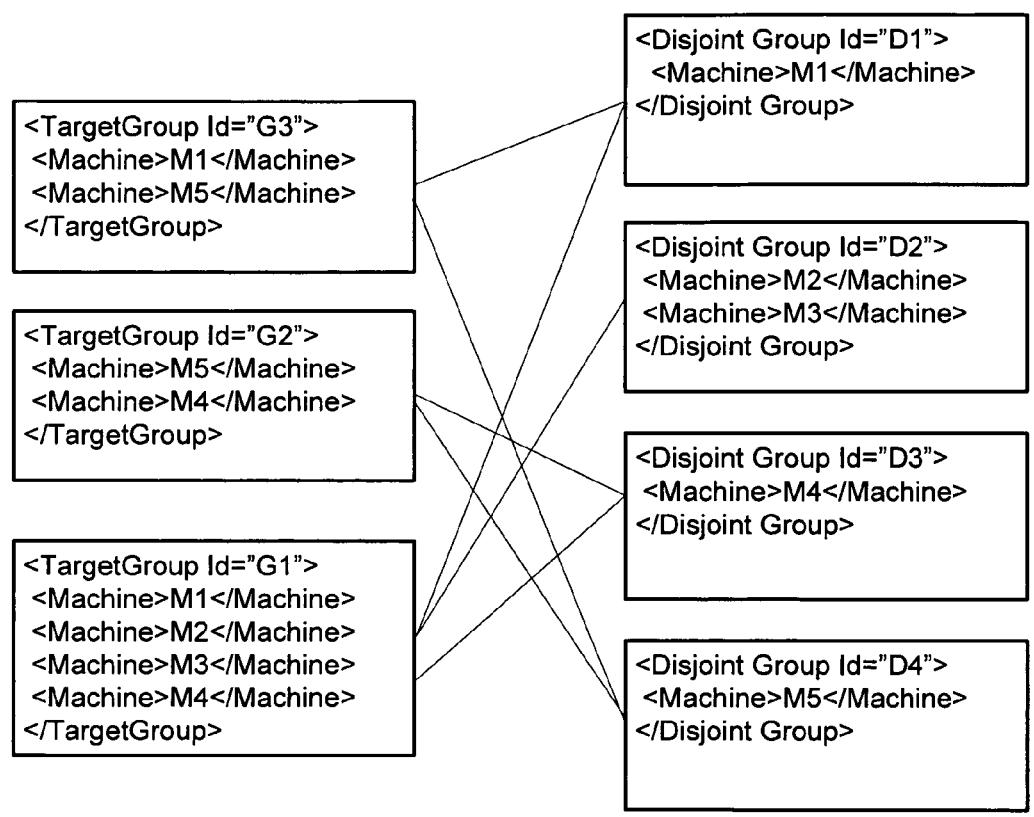

After the completion of step 1 above, the groups are disjointed as illustrated in FIG. 7. Lines going between target groups and disjoint groups indicate the target groups that were used to form the disjoint groups.

Figure 8:
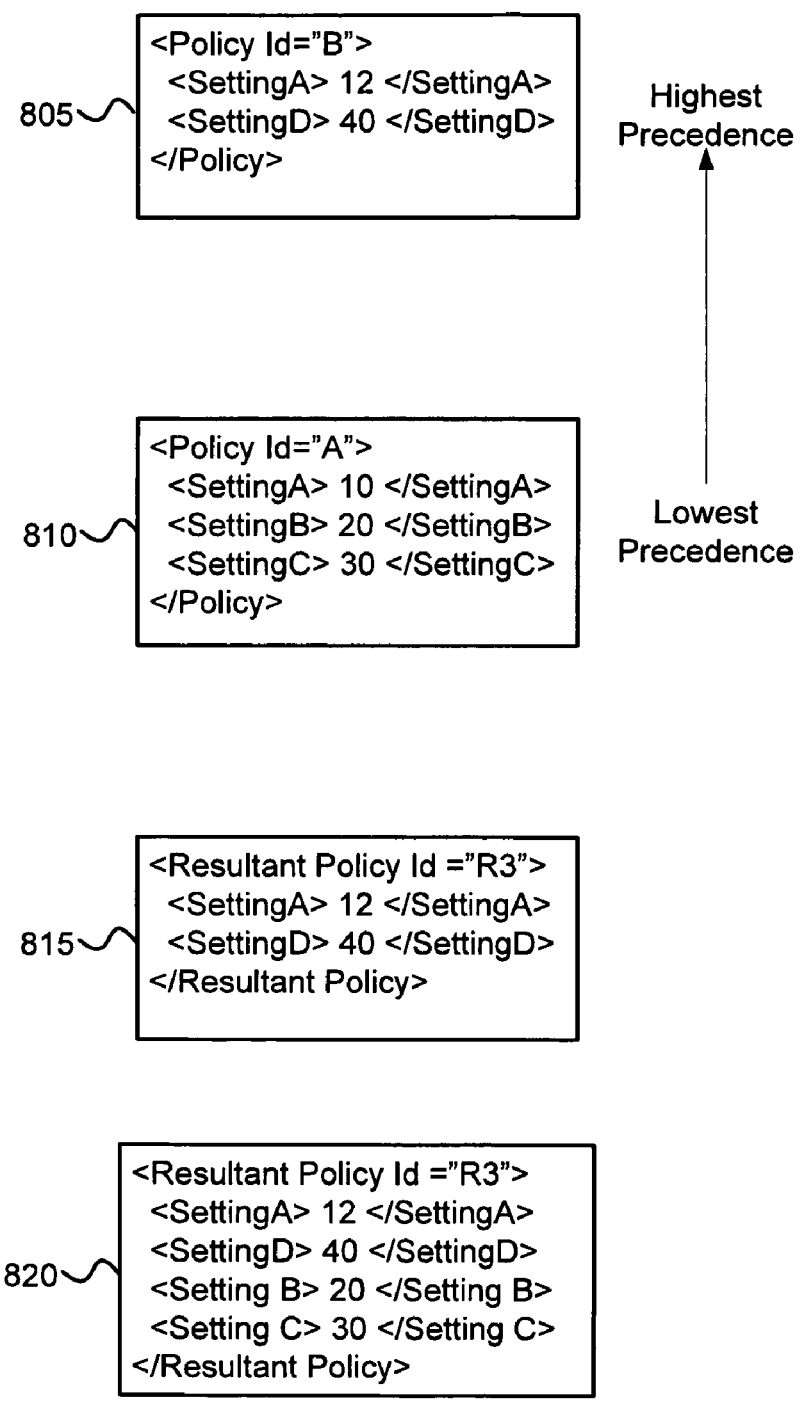

FIG. 8 is a block diagram that illustrates actions taken to the disjoint group D3 of FIG. 7 according to step 2 above in accordance with aspects of the subject matter described herein. At step 2(D) above, the algorithm starts with policy B (block 805) and copies all of the settings in policy B in the resultant policy R3 (block 815). As the algorithm proceeds, the settings included in policy A (block 810) that are not in R3 (block 815) are copied into R3 with the result being shown in block 820. Since there are no more policies that are applicable to D3, the resultant policy, R3 (block 820), for D3 has been computed. The algorithm then proceeds to the next disjoint group.

Figure 9:
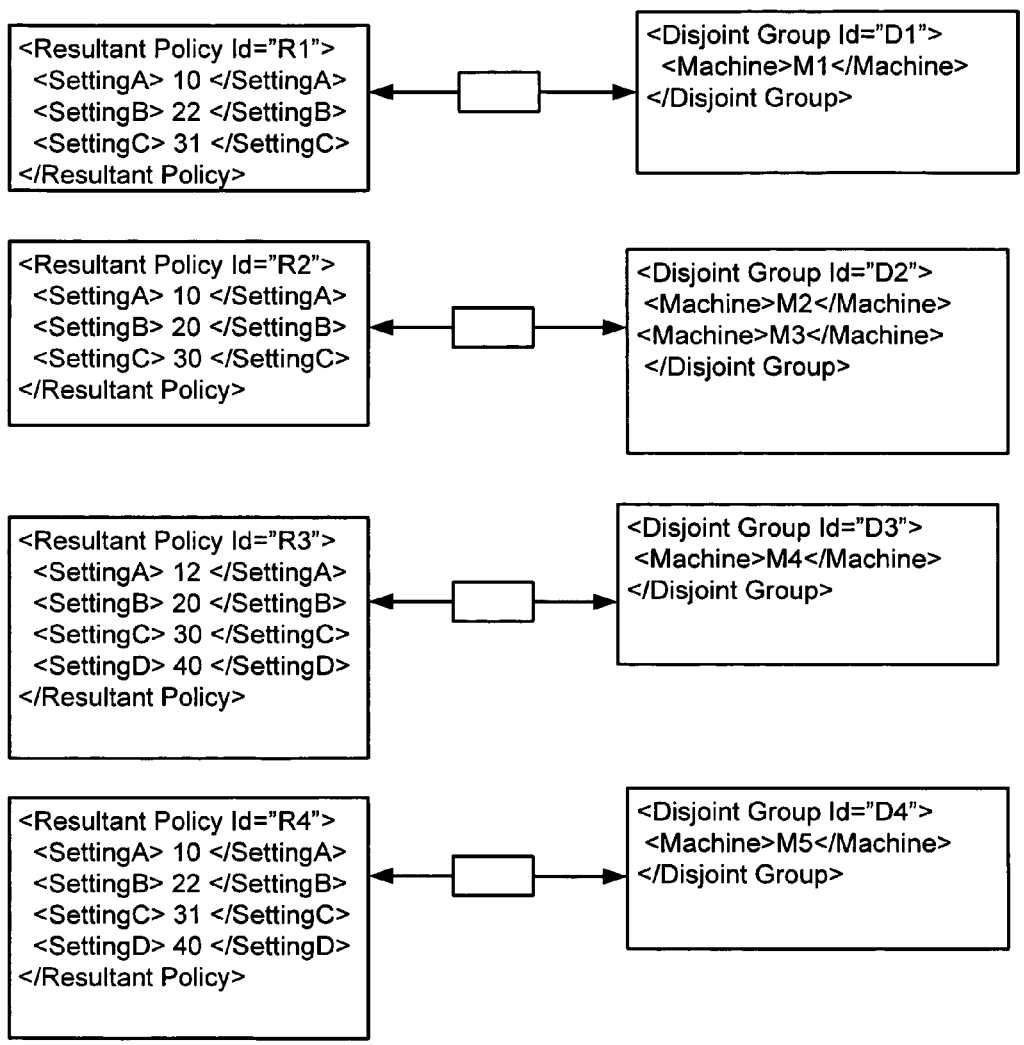

Upon completion of the algorithm, the resulting set of different policies has increased to 4. This results because machines M2 and M3 have identical settings and the other machines have different settings. The memberships of the target groups are disjoint. The resulting set of policies and the disjoint groups they are bound to are illustrated in FIG. 9.

In one embodiment, the resultant policies may be renamed to reflect the original names where appropriate as described previously. For example, the resultant policy R1 may be renamed as policy C and the resultant policy R2 may be renamed as policy A.

Figure 10:
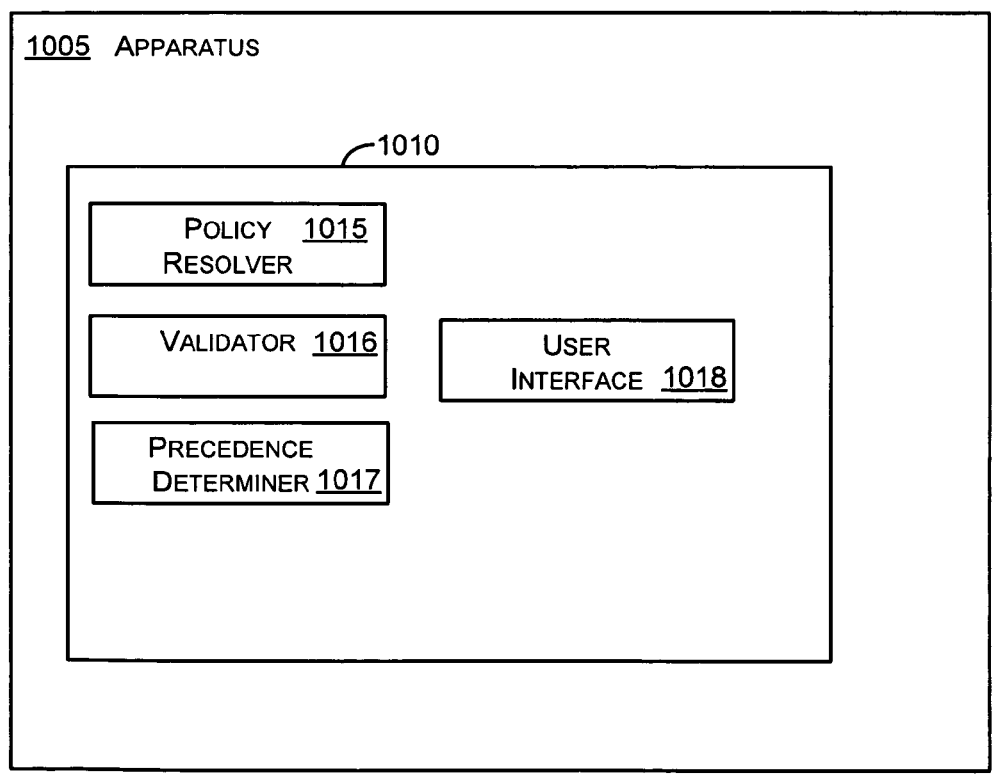
FIG. 10 is a block diagram illustrating various components that may be included in an apparatus arranged in accordance with aspects of the subject matter described herein.

FIG. 10 is a block diagram illustrating various components that may be included in an apparatus arranged in accordance with aspects of the subject matter described herein. The components illustrated in FIG. 10 are exemplary and are not meant to be all-inclusive of components that may be needed or included. In other embodiments, the components or functions described in conjunction with FIG. 10 may be included in other components or placed in subcomponents without departing from the spirit or scope of aspects of the subject matter described herein. In some embodiments, the components or functions described in conjunction with FIG. 10 may be distributed across multiple devices that are accessible to the apparatus 1005.

Turning to FIG. 10, the apparatus 1005 may include policy components 1010 which may comprise a policy resolver 1015, a validator 1016, a precedence determiner 1017, and a user interface 1018.

The policy resolver 1015 may determine a resultant policy based on a set of policies, bindings, and target groups as indicated by the algorithms described herein. In doing so, the policy resolver may be operable to determine a resultant policy to apply to an entity by ensuring that for a property that is included in only one policy that there is a corresponding property in the resultant policy and that a for a property that is included in two or more policies associated with an entity, that the highest precedence policy is retained in the resultant policy.

The validator 1016 may be operable to ensure that correct input is received regarding bindings. For example, the validator 1016 may interface with the user interface 1018 and determine whether an indicated binding is allowed and whether a precedence assigned to the binding is allowed. If a user attempts to assign two bindings the same precedence where the two bindings that have contradictory properties affecting an entity, the validator 1016 may generate an error and indicate that a different precedence needs to be selected.

The precedence determiner 1017 may be operable to determine precedences of bindings. In some embodiments, this may be determining a position of the binding in a stack. In other embodiments, this may involve obtaining precedence values associated with the bindings.

The user interface 1018 may be used to create, delete, or modify bindings as allowed by the validator 1016 and security mechanisms that allow changes, if any.

Figure 11:
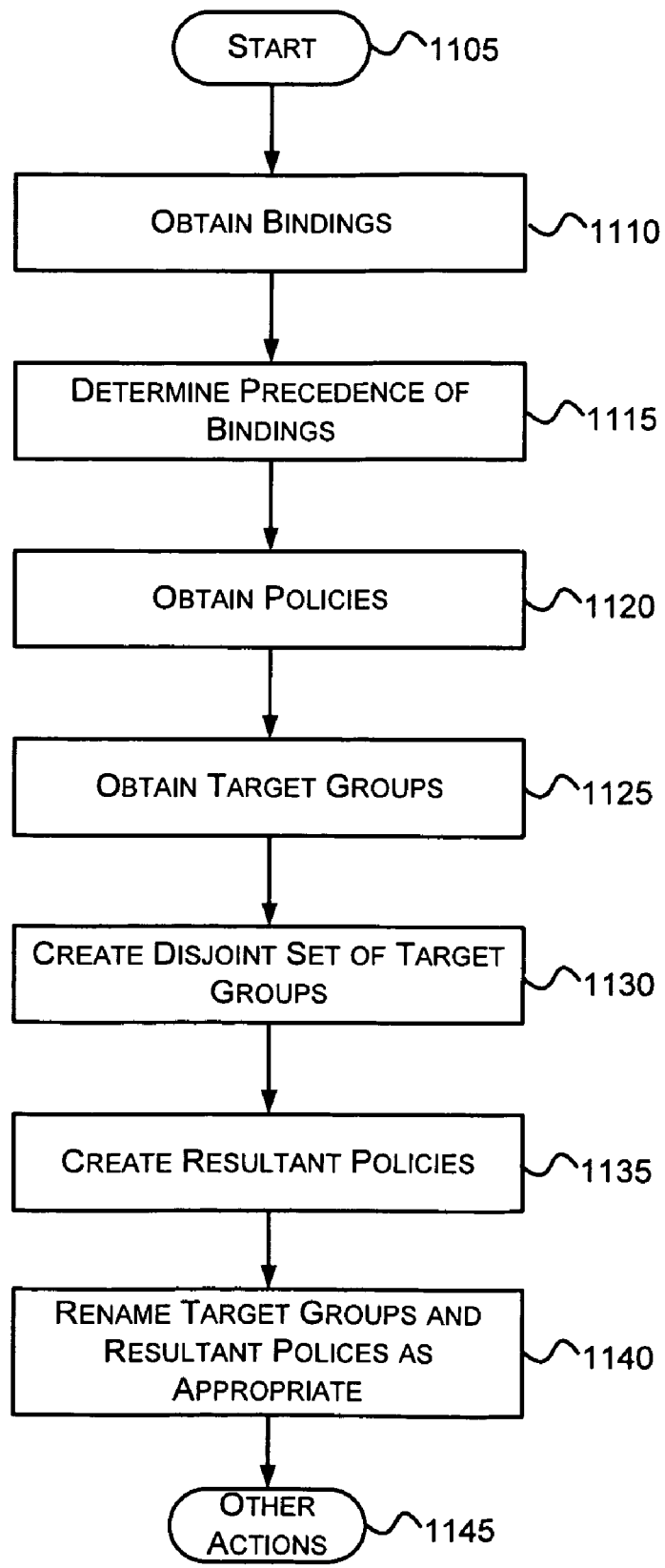
FIGS. 11 and 12 are flow diagrams that general represent actions that may occur in determining effective policy associated with one or more entities in accordance with aspects of the subject matter described herein.
Figure 12:
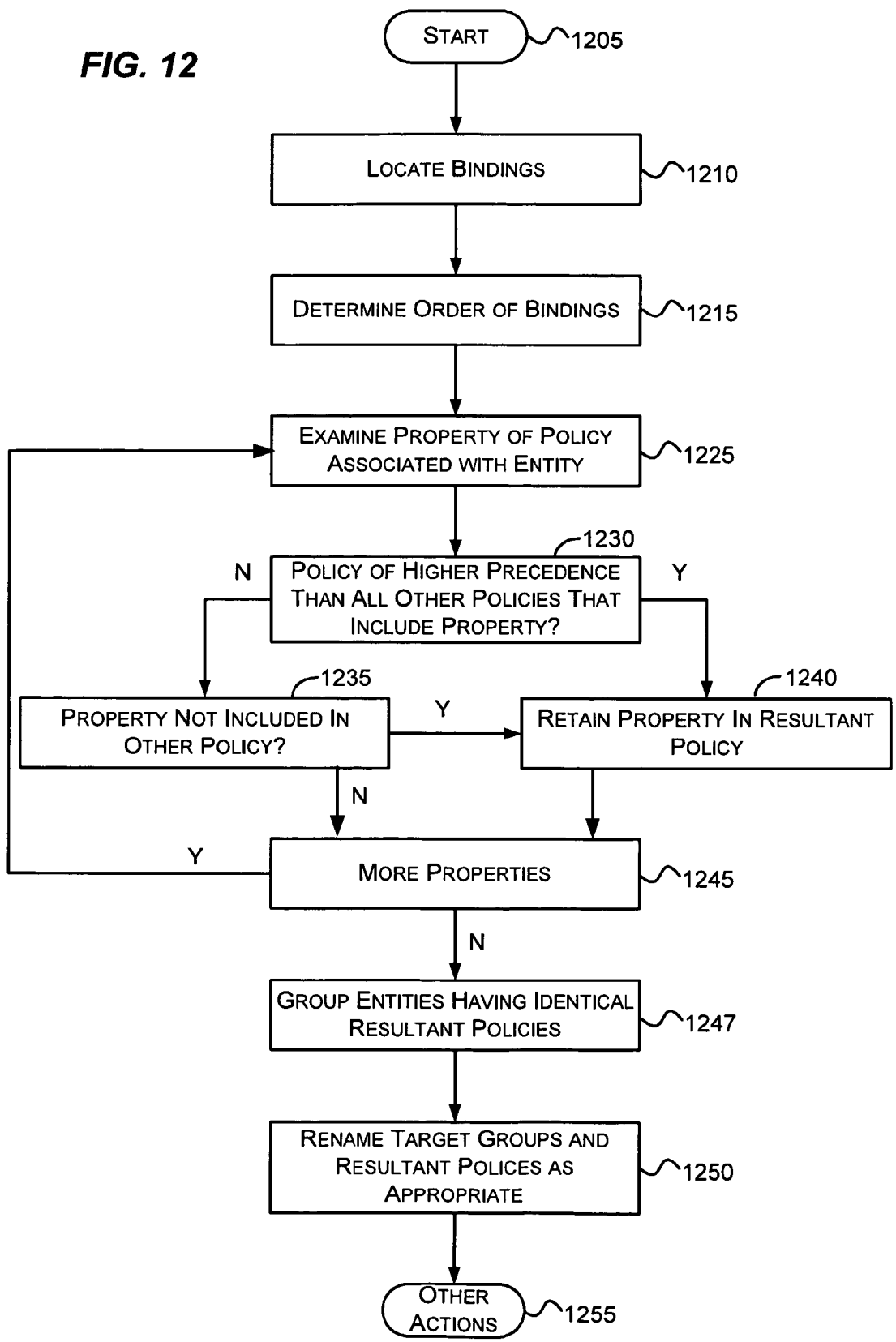

FIGS. 11 and 12 are flow diagrams that general represent actions that may occur in determining effective policy associated with one or more entities in accordance with aspects of the subject matter described herein. Each of FIGS. 11 and 12 represent different embodiments of an algorithm that may be used to determine effective policy for one or more entities. Yet other embodiments have been described above. It is not intended to limit the scope of aspects of the subject matter described herein to these particular embodiments. Indeed, based on the teachings contained herein, those skilled in the art may recognize yet other implementations that perform the same result through similar actions as described herein. Such other implementations are also within the scope and spirit of aspects of the subject matter described herein.

For simplicity of explanation, the methodology described in conjunction with FIGS. 11-12 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 11, at block 1105, the actions begin. At block 1110, bindings are obtained. For example, referring to FIG. 4, the bindings shown therein are obtained (e.g., from a data structure).

At block 1115, the precedence of the bindings is determined. For example, referring to FIG. 10, the precedence determiner 1017 determines the precedence of the bindings of FIG. 4. In one embodiment, the precedence of the bindings may be determined as the bindings are created by placing them in a stack or other data structure that indicates precedence. In another embodiment, the precedence of the bindings may be determined by values associated with (e.g. included in) the bindings as described previously.

At block 1120, policies associated with the bindings are obtained. The policies may be obtained as needed as a binding is examined. For example, referring to FIG. 10, the policy resolver 1015 may obtain the policy C indicated in FIG. 6. After information is extracted from the policy C upon evaluation of a lower precedence binding, the policy B may be obtained, and so forth. Note also that the actions of obtaining the policies first or the target groups first or even creating the disjoint set first or in some other order may be performed in different embodiments without departing from aspects of the spirit or scope of the subject matter described herein.

At block 1125, target groups associated with the bindings are obtained. For example, referring to FIG. 10, the policy resolver 1010 obtains the target group G3 associated with the policy C.

At block 1130, a disjoint set of target groups is created. For example, referring to FIG. 10, the policy resolver 1010 creates the disjoint set of target groups D1-D4 from the target groups G1-G3.

At block 1135, resultant policies are created. For example, referring to FIG. 10, the policy resolver 1010 creates the resultant policy R3 (e.g., block 820 of FIG. 8) by examining the policies B and A and retaining higher precedence policies as previously explained.

At block 1140, target groups and resultant policies are renamed as appropriate. For example, referring to FIG. 10, the policy resolver 1010 renames resultant policies associated with the target groups TG1 and TG2 to C and A, respectively, as these policies are identical to these two original policies.

At block 1145, other actions, if any, may be performed.

Turning to FIG. 12, at block 1205, the actions begin.

At block 1210, the bindings are located. For example, referring to FIG. 10, the precedence determiner 1017 may locate bindings in volatile or non-volatile computer memory.

At block 1215, an order of the bindings is determined. At this block, actions similar to those of block 1115 may be performed.

At block 1225, a property associated with an entity is examined. For example, referring to FIGS. 10 and 8, the policy resolver 1015 may examine the property SettingA of block 805.

At block 1230, a determination is made as to whether the policy is of higher precedence than all other policies that include the property. The policy is of higher precedence if it is referred to by a binding that is of higher precedence than other bindings referring to policies having the property. If so the actions continue at block 1240; otherwise, the actions continue at block 1235. For example, referring to FIG. 8, SettingA of block 805 is of the highest precedence. In another embodiment, because of the order in examining policies (e.g., from highest to lowest precedence), just finding a property in a policy that is not already included in the resultant policy may indicate that the property needs to be added to the resultant policy.

At block 1235, a determination is made as to whether the property is included in any other policy. If so, the actions continue at block 1240; otherwise, the actions continue at block 1245. For example, referring to FIG. 10, the policy resolver 1015 determines whether the property is included in any other policy. In another embodiment, this action and the action associated with block 1230 may be replaced by other actions. In this embodiment, if the property is not included in the resultant policy, it is copied to the resultant policy. Again, this may be performed when working from highest precedence policy to lowest precedence policy.

At block 1240, the property is retained in the resultant policy. For example, referring to FIG. 10, the policy resolver 1015 copies a property that is included in a property into the resultant policy.

At block 1245, a determination is made as to whether there is another property to examine. If so, the actions continue at block 1230; otherwise, the actions continue at block 1250. For example, referring to FIG. 10, the policy resolver 1015 determines if there is another property that needs to be combined into the resultant policy.

At block 1247, entities having identical resultant policies are grouped. For example, actions similar to step 1 of phase 2 of an algorithm previously described may be performed.

At block 1250, target groups and resultant policies are renamed as appropriate. For example, referring to FIG. 10, the policy resolver 1010 renames resultant policies associated with the target groups TG1 and TG2 to C and A, respectively, as these policies are identical to these two original policies.

At block 1255, other actions, if any, may be performed.

As can be seen from the foregoing detailed description, aspects have been described related to determining effective policy. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
    using a computer, obtaining a plurality of bindings, each binding associating at least one policy with at least one target group;
    obtaining a plurality of policies indicated by the bindings, each policy including one or more properties regarding a configuration to apply to one or more entities;
    obtaining a first set of target groups associated with the policies via the bindings, each target group indicating one or more entities;
    using the computer, determining a precedence of the bindings, a precedence indicating which policy controls when two or more policies having at least one shared property are associated with an entity;
    creating a disjoint set of target groups, with each target group of the disjoint set associated with a single policy, the single policy being derived from one or more of the plurality of policies by using at least in part the precedence; and
    renaming the single policy to an original policy included in the plurality of policies if the single policy and the original policy have identical properties.

2. The method of claim 1, wherein determining a precedence of the bindings comprises using a stack by which the bindings are arranged in order of precedence.

3. The method of claim 1, wherein determining a precedence of the bindings comprises using values associated with the bindings, the values indicating a precedence of the bindings.

4. The method of claim 1, wherein creating a disjoint set of target groups comprises placing each entity indicated in the first set of target groups that has a set of one or more policies associated with the entity, the set of one or more policies having a particular precedence, into a target group that includes the entity and all other entities in the first set of target groups that have only the set of one or more policies associated with them in the particular precedence.

5. The method of claim 1, wherein the single policy being derived from one or more of the plurality of policies by using at least in part the precedence comprises performing actions comprising:
    starting with a first policy having a highest precedence;
    adding all properties in the first policy to a resultant policy;
    examining a second policy having a precedence lower than the first policy;
    determining if the second policy has a properties that is not in the resultant policy; and
    if the second policy has a property that is not in the resultant policy, adding the property to the resultant policy.

6. The method of claim 1, wherein the single policy being derived from one or more of the plurality of policies by using at least in part the precedence comprises:
    starting with a first binding having lowest precedence;
    locating a target group indicated by the binding;
    evaluating the target group to produce a set of all targets in the target group;
    locating a policy indicated by the binding;
    applying any properties included in the policy to each element of the set of all targets such that if a property does not exist in an element, it is created and if the property already exists in the element, overwriting it with its corresponding property in the policy; and
    moving to a second binding having precedence just above the lowest precedence.

7. The method of claim 1, wherein creating a disjoint set of target groups comprises:
    determining entities that have a set of properties with identical names and values; and
    placing the entities into a resultant target group.

8. The method of claim 7, further comprising renaming the resultant target group with a name of an original target group in the first set of target groups if the resultant target group and the original target group identify identical entities.

9. A computer storage medium, the computer storage medium not consisting of a propagating signal, the computer storage medium having computer-executable instructions, which when executed perform actions, comprising:
    locating a plurality of bindings, each binding associating at least one policy with at least one entity;
    determining an ordering of the bindings in which a policy of a binding having a first order in the ordering controls when conflicting with a policy of a binding having a second order in the ordering;
    combining properties of policies associated with an entity and creating a resultant policy associated with the entity by performing actions, comprising:
        if a policy of a binding having a first order includes a property that is included in a policy of one or more bindings having other orders, retaining the property of the policy of the binding having the first order in the resultant policy; and if a policy of a binding of any order includes a property that is not included in a policy of any other binding, retaining the property of the policy of the binding of any order in the resultant policy; and renaming the resultant policy to an original policy included in the policies if the resultant policy and the original policy have identical properties.

10. The computer storage medium of claim 9, wherein a policy of a binding having a first order has a higher precedence than a policy of a binding having a second order.

11. The computer storage medium of claim 9, wherein each property comprises a tuple that includes a name and value, the name identifying the property and the value including a setting of the property.

12. The computer storage medium of claim 9, further comprising grouping entities having identical resultant policies and associating the entities so grouped with their corresponding resultant policies such that a single policy is associated with its corresponding group of entities.

13. The computer storage medium of claim 9, wherein determining an ordering of the bindings comprises examining at least one data structure that indicates an ordering of the bindings.

14. The computer storage medium of claim 9, wherein a binding associates a policy with at least one entity via a first reference to the policy and a second reference to a target group, the target group indicating the at least one entity and capable of indicating one or more other entities associated with the policy via the binding.

15. The computer storage medium of claim 13, wherein the at least one data structure comprises a stack.

16. The computer storage medium of claim 14, wherein the at least one data structure comprises one or more values, one value for each entity, the one or more values indicating the ordering of the entities.

17. In a computing environment, an apparatus, comprising:
   a user interface component operable to receive a first indication of a binding that associates a policy with a target group that includes entities to which the policy is to be applied, the user interface component further operable to receive a second indication of a precedence associated with the binding;
   a validator operable to ensure that the first and second indications are valid;
   a policy resolver operable to determine a resultant policy to apply to an entity, the resultant policy being derived from one or more policies associated with the entity by actions, comprising:
      ensuring that for a property that is included in only one policy associated with the entity that there is a corresponding property in the resultant policy;
      ensuring that for a property that is included in two or more policies associated with the entity, one of the two or more policies having a highest precedence, that the property associated with the highest precedence policy is retained in the resultant policy; and
      renaming the resultant policy to an original policy included in the one or more policies if the resultant policy and the original policy have identical properties.

18. The apparatus of claim 17, wherein the second indication is valid if no two bindings have an identical precedence.

19. The apparatus of claim 17, wherein the first indication is valid if both the policy and the target group exist.

* * * * *

UNITED STATES PATENT AND TRADEMARK OFFICE
CERTIFICATE OF CORRECTION

PATENT NO.         : 8,166,516 B2                                    Page 1 of 1
APPLICATION NO.    : 12/057352
DATED              : April 24, 2012
INVENTOR(S)        : McCollum et al.

It is certified that error appears in the above-identified patent and that said Letters Patent is hereby corrected as shown below:

In the Claims

In column 14, line 22, In Claim 5, delete "properties" and insert -- property --, therefor.

Signed and Sealed this
Third Day of February, 2015

Michelle K. Lee
*Deputy Director of the United States Patent and Trademark Office*